Patented Dec. 31, 1946

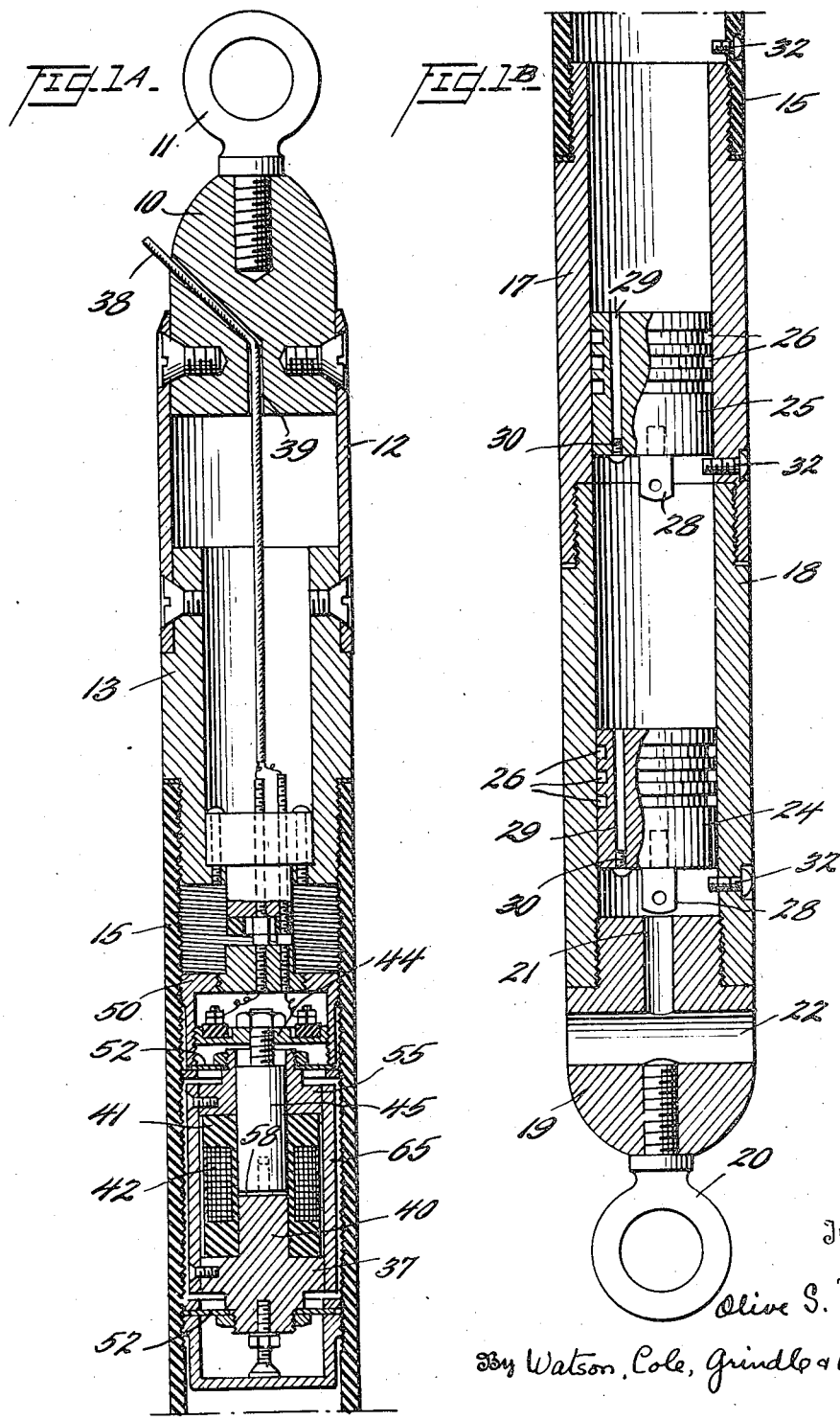

2,413,651

UNITED STATES PATENT OFFICE 2,413,651

MEASURING INSTRUMENT

Olive S. Petty, San Antonio, Tex.

Application August 29, 1944, Serial No. 551,723

1 Claim. (Cl. 177—352)

This invention relates to improvements in cased measuring instruments and the like which are employed in obtaining data at excessive depths below the earth's surface, or below the surface of water. It is the principal object of the invention to provide means whereby such instruments, adequately housed to prevent the ingress of water or foreign material, will not be damaged by the excessive pressures to which they are subjected.

More specifically, it is an object of the invention to provide a casing for enclosing an instrument of the type described, having means associated therewith which allows the pressure within the casing to increase with increase of externally applied pressure, thereby preventing crushing or distortion of the casing and reducing the danger of leakage of water and foreign material into the casing. It will be appreciated that by means of the present invention, such instrument casings need have much less structural strength and may therefore be built of lighter materials and at less cost than would otherwise be possible.

In the preferred embodiment of the invention, the equalization of pressure within and without the casing is effected by the use of one or more pistons which are displaceable in a cylindrical passage affording communication between the interior and the exterior of the casing, these pistons being constructed to prevent the ingress of water or solid material past the same, and being displaceable by increase in external pressure, so as to apply a pressure of the same order to the interior of the casing.

The invention is illustrated as applied to a seismometer or detector for use in seismic surveying, in which field it finds an important application. In the interpretation of seismic records obtained by reflection surveying, in which the time elapsing between the firing of an explosive charge and the arrival of impulses reflected upwardly from various beds is recorded, it is important to know the approximate velocity of the seismic waves in the subterranean strata in order to compute the depths of the reflecting beds. For this purpose it is common practice to lower a seismic detector into a deep drilled well to various depths, and to fire a charge of explosive at the earth's surface adjacent the well, whereby the velocity of the seismic energy between the surface and the detector at the known depth may be ascertained. It is often necessary to submerge the detector in wells which are filled with mud and water to depths of thousands of feet, at which tremendous pressures are exerted. In the absence of means for effecting substantial equalization of the pressures existing outside and inside of the detector casing, the casing must be extremely rugged, quite heavy, and designed with the greatest care to prevent the infiltration of water and mud. The utility, especially in this field, of devices for insuring that the pressure within the casing will be comparable to the externally applied pressure will be at once apparent.

Further objects and features of the invention will appear from the following description taken in connection with the accompanying drawing in which:

Figures 1A and 1B are longitudinal sectional views of different portions of a seismometer or detector illustrating the application of the invention thereto, the instrument being shown in two views because of its extreme length.

In order to facilitate the description of the invention and to promote an understanding of its principles, the invention is illustrated by a specific and preferred embodiment thereof. It will nevertheless be appreciated that various alterations and further modifications of the illustrated structure are contemplated such as fall within the purview of the invention and especially within the scope of the claim appended hereto.

The seismometer or detector shown in the drawings includes the instrument proper and the casing therefor, the casing being formed in a number of separate parts for convenience in manufacture and assembly. Thus, the upper end of the casing may include a top cap 10 to which is secured an eye 11 for the reception of a cable by means of which a detector can be lowered into a well. Secured to the top cap and to each other are casing sections 12 and 13. The main casing section 15 is preferably formed of insulating material, such as a thermosetting resin, to minimize the possibility of short circuits or electrical leakage from the instrument but may be formed of a non-magnetic metal such as brass. Secured to the lower end of the casing section 15, and to each other, are casing sections 17 and 18, a bottom cap 19 being threaded into the lower end of casing 18 and being provided with an eye 20 to which a weight may be attached, when necessary, to insure rapid descent of the instrument into the well. It will be observed that the casing is open throughout its length, the upper end being sealed by the top cap 10. The bottom cap 19 is apertured as indicated at 21 and 22 to afford communication between the interior and the exterior of the casing.

The casing is preferably cylindrical throughout for convenience in manufacture and assembly, and the casing sections 17 and 18 are preferably machined or otherwise smoothly finished internally to provide a continuous cylindrical portion in which are disposed one or more pistons, two being shown in the drawing as indicated at 24 and 25, these pistons fitting snugly within the cylinder thus formed so that they will reciprocate freely therein but will impede or prevent the flow of liquid from one side of each piston to the other between the peripheral portions of the piston and the casing. Each piston may be formed with a plurality of annular grooves 26 serving as traps for any liquid or foreign material which may seep past the piston, and each is provided with an eye 28 in the lower end thereof whereby it may be withdrawn from the casing for repair or inspection, passages 29, normally closed by removable plugs 30, being provided through each piston to facilitate its insertion and withdrawal. Removable stops 32 are provided in the casing wall to limit axial displacement of the pistons.

Before the pistons 24 and 25 are assembled in the casing, the instrument proper, hereinafter described, is positioned within section 15 of the casing, the casing is supported in inverted position, and completely filled with oil or other suitable liquid which is non-injurious to the instrument, the oil being circulated to remove air bubbles and thereby reduce the piston displacement for any given change in external pressure. The piston 25 is then introduced substantially to the position in which it is shown in the drawing and is suspended in this position by a suitable tool engaging the eye 28. The plug 30 is then inserted, so that further displacement of the piston is prevented by the oil, when the tool may be withdrawn. Piston 24 is then similarly positioned as shown in the drawing, and the stops 32 are introduced in the casing wall. That portion of the casing which receives the bottom cap 19 is then filled with grease, as are the passages 21 and 22 of the bottom cap, and the detector is ready for use.

It will be appreciated that as the detector is lowered into the well and the pressure increases, the grease in the bottom cap 19 will be forced upwardly, displacing pistons 24 and 25 upwardly, the extent of the displacement being determined by the nature of the fluid incorporated in the instrument casing. Only a limited amount of water, mud, or other foreign material in the well will enter the casing, and no appreciable amount will be forced past the lower piston 24, but it often is preferable to employ two pistons as an added precaution. The pressure within the casing will thereby be maintained at substantially the external pressure, danger of crushing the casing is eliminated, the leakage through the casing wall at the joints between the several sections is minimized.

The details of the measuring instrument incorporated in the casing form no essential part of the instant invention. Preferably the instrument, if used for detection of seismic impulses, is constructed as shown in my prior patent, No. 2,348,225, granted May 9, 1944. The principal parts of this instrument may be described as follows:

A disc 50, which may be formed of a magnetic metal, is threaded on its periphery to engage with corresponding threads in the casing section 15, and is thus maintained rigidly in the casing. A bar or core armature 45, disposed centrally of the casing, is mounted on an element 44 threaded in the disc 50, and extends loosely within an insulating spool 41 which carries the winding or coil 42. A tubular or like magnet 65 surrounds the coil 42 and is supported at one end on a pole piece 55 at its opposite end on a pole piece 37 which is of substantial size and is formed integrally with a pole tip 40, the latter extending within and engaging and supporting the spool 41. The pole pieces 55 and 37 are suspended from the walls of the casing section 15 by diaphragm springs 52, whereby the unitary structure constituted by the magnet 65 and the pole pieces 55 and 37 may move axially of the casing, with resultant variation in the length of the variable air gap 58 between the face of the pole tip 40 and the adjacent face of the armature 45. The leads 38 connected to the ends of the winding 42 may be brought through an aperture 39 in the top cap 10 of the instrument casing and thence to suitable amplifying and recording mechanism.

In operation, the mass of the yieldingly supported magnetic structure, including the pole pieces and the magnet, is substantial, and when the instrument casing is caused to vibrate in the direction of its axis in response to the arrival of seismic impulses, the casing will partake of longitudinal vibratory movement with respect to the magnetic structure, which thus constitutes the equivalent of a steady mass. The air gap 58 in the magnetic system is thereby varied, resulting in rapid change in the flux of the magnetic circuit, whereby a varying voltage is induced in the coil 42. From a record of this voltage change, it is possible to ascertain the time required for a seismic impulse generated by an explosion at the surface to travel down through the underlying strata to the depth at which the detector is located.

It will be appreciated that the oil or other fluid which is enclosed in the casing need not adversely affect the operation of the instrument. On the contrary, in the case of a seismometer in which damping of vibratory movement is desirable, the presence of a suitable fluid, such as oil, is beneficial.

Reference herein to the pistons 24 and 25 as solid is intended to distinguish from fluid and gaseous pistons, there being no implication that the pistons may not be hollow.

Having thus described the invention, what is claimed as new and desired to be secured by Letters Patent is:

In a submersible measuring apparatus of the type subjected in use to high external pressures, the combination with a casing having a liquid filled compartment for housing a measuring instrument and having a passage affording communication between said compartment and the casing exterior, said passage including a cylindrical bore, of a tight fitting, solid piston closing said bore and displaceable axially thereof in response to variation in external pressure to which the casing is subjected, whereby said compartment is maintained substantially at the prevailing external pressure, said piston being formed to provide at least one annular peripheral groove to trap water or foreign material seeping between the piston and bore.

OLIVE S. PETTY.